(12) United States Patent
Hieser et al.

(10) Patent No.: US 11,856,087 B2
(45) Date of Patent: Dec. 26, 2023

(54) METHOD FOR GENERATING RANDOM NUMBERS

(71) Applicant: Schneider Electric Industries SAS, Rueil-Malmaison (FR)

(72) Inventors: Alexander Hieser, Wuerzburg (DE); Marcus Zinn, Rodgau (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 160 days.

(21) Appl. No.: 17/449,819

(22) Filed: Oct. 4, 2021

(65) Prior Publication Data
US 2022/0116202 A1    Apr. 14, 2022

(30) Foreign Application Priority Data

Oct. 14, 2020 (EP) .................................. 20306205

(51) Int. Cl.
*H04L 29/06* (2006.01)
*H04L 9/06* (2006.01)

(52) U.S. Cl.
CPC .......... *H04L 9/0643* (2013.01); *H04L 9/0656* (2013.01)

(58) Field of Classification Search
None
See application file for complete search history.

(56) References Cited

U.S. PATENT DOCUMENTS

| | | | | |
|---|---|---|---|---|
| 11,121,869 B1 * | 9/2021 | Crahen | ................. | H04L 9/3242 |
| 11,128,638 B2 * | 9/2021 | Mullins | ................. | H04W 12/06 |
| 11,468,356 B2 * | 10/2022 | Kvochko | ............... | G06N 10/00 |
| 11,694,786 B1 * | 7/2023 | Van Wilt | ................ | G16H 20/70 |
| | | | | 600/27 |

(Continued)

FOREIGN PATENT DOCUMENTS

| | | |
|---|---|---|
| CN | 107589833 A | 1/2018 |
| CN | 206848996 U | 1/2018 |

(Continued)

OTHER PUBLICATIONS

Corbett, Matthew et al. "GazePair: Efficient Pairing of Augmented Reality Devices Using Gaze Tracking." ArXiv abs/2303.07404 (2023); p. 1-15. (Year: 2023).*

(Continued)

*Primary Examiner* — Jeffery L Williams
(74) *Attorney, Agent, or Firm* — Oblon, McClelland, Maier & Neustadt, L.L.P.

(57) ABSTRACT

The present invention relates to a method of generating random numbers for cryptographic applications, in which a recording of an environment is generated by means of a detection unit, the recording is presented by means of a display device, a virtual object is positioned in the presentation of the recording in the environment, real world coordinates for real world points in a real world coordinate system are determined for the environment, virtual world coordinates for one or more virtual world points in a virtual world coordinate system are determined for the virtual (Continued)

Figure 1:
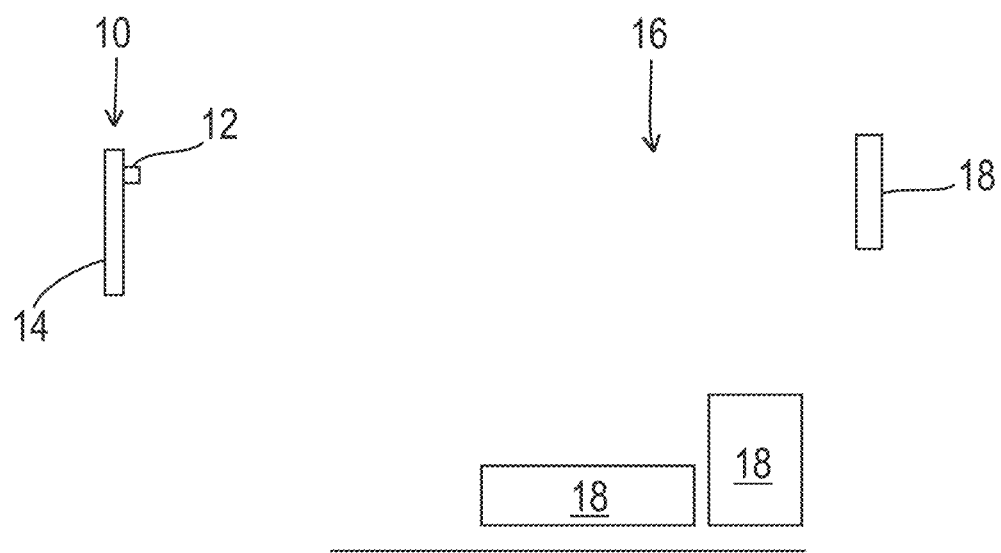

object, at least the real world coordinates of a real world point of the environment and the virtual world coordinates of a virtual world point of the virtual object are used to generate a random number, and the random number is used in a cryptographic application.

18 Claims, 2 Drawing Sheets

(56) References Cited

U.S. PATENT DOCUMENTS

| | | | |
|---|---|---|---|
| 2008/0189356 A1* | 8/2008 | Thomas | G06F 7/588 718/1 |
| 2009/0262928 A1* | 10/2009 | Busari | H04L 9/0869 708/250 |
| 2016/0012252 A1* | 1/2016 | Deleeuw | G06F 21/6254 726/26 |
| 2016/0307001 A1 | 10/2016 | Dow et al. | |
| 2017/0032131 A1 | 2/2017 | Dow et al. | |
| 2020/0125782 A1* | 4/2020 | Chiang | G06F 7/588 |
| 2022/0116202 A1* | 4/2022 | Hieser | H04L 9/0656 |

FOREIGN PATENT DOCUMENTS

| | | |
|---|---|---|
| CN | 108337080 A | 7/2018 |
| CN | 109583187 A | 4/2019 |
| EP | 3 605 996 A1 | 2/2020 |
| FR | 3 073 301 A1 | 5/2019 |
| GB | 2522606 A | 8/2015 |
| KR | 10-1860443 B1 | 5/2018 |
| WO | WO 2018/138724 A1 | 8/2018 |
| WO | WO 2018/187075 A1 | 10/2018 |
| WO | WO 2019/040065 A1 | 2/2019 |

OTHER PUBLICATIONS

Extended European Search Report dated Mar. 25, 2021 in European Patent Application No. 20306205.4, citing documents AA, AL, and AZ-AY therein, 7 pages.

Alin Suciu, et al., "Unpredictable Random Number Generator Based on Mobile Sensors," 2011 IEEE International Conference on Intelligent Computer Communication and Processing (ICCP), XP032063543, 2011, pp. 445-448.

Jan Krhovják, et al., "The Sources of Randomness in Mobile Devices," Proceeding of the 12$^{th}$ Nordic Workshop on Secure IT Systems, XP055498422, 2007, 12 pages.

* cited by examiner

METHOD FOR GENERATING RANDOM NUMBERS

The present invention relates to a method of generating random numbers, in particular for cryptographic applications. "True" random numbers are ideally required for cryptographic applications, for example, the secure or encrypted communication between two participants. Since true random numbers can in practice often only be generated with a great effort, pseudo-random numbers are also used instead that then likewise have a sufficient degree of randomness to prevent a vulnerability of the encrypted communication.

Such encrypted communication is becoming increasingly important, in particular also in the control of industrial processes. Thus, the communication with field devices, which serve to control and monitor industrial processes, should ideally also take place in an encrypted manner. The field devices can, for example, control actuators of the industrial process and evaluate sensor data from the industrial process. Due to an encrypted communication with the field devices or among the field devices, the vulnerability or manipulability of the industrial process can be prevented.

There is therefore a fundamental need for cryptographic applications that, for example, enable a secure communication in industrial processes. For such cryptographic applications, the initially mentioned random numbers are again indispensable, wherein the random numbers should be as random as possible. Random in this context means that the random number is unpredictable, even if an attacker knows all the parameters of the system generating the random number.

It is therefore the underlying object of the invention to provide a method of generating random numbers in which such highly random numbers are generated such that a secure use of the random numbers in cryptographic applications is possible.

This object is satisfied by a method in accordance with claim 1.

The method of the invention relates to the generation of random numbers for cryptographic applications, wherein, in the method,
- a recording of an environment is generated by means of a detection unit,
- the recording is presented by means of a display device,
- a virtual object is positioned in the presentation of the recording in the environment,
- real world coordinates for real world points in a real world coordinate system are determined for the environment,
- virtual world coordinates for one or more virtual world points in a virtual world coordinate system are determined for the virtual object,
- at least the real world coordinates of a real world point of the environment and the virtual world coordinates of a virtual world point of the virtual object are used to generate a random number, and
- the random number and/or a value derived from the random number is/are used in a cryptographic application. Alternatively, the method could also already end after the generation of the random number, wherein the random number is, for example, first stored and later used in a cryptographic application.

In short, a presentation of the environment is therefore displayed to a user, wherein the user then places the virtual object in the presentation of the environment at any desired position and in any desired orientation. In accordance with the invention, it has been shown that there are very many sources of randomness in such an approach such that the random number, which is in particular generated from the real world coordinates and the virtual world coordinates, is likewise highly random. Due to the high randomness, the vulnerability of the cryptographic application, in which the random number generated is used, is again greatly reduced.

The method will be described again in more detail in the following.

The detection unit can, for example, be a camera that is e.g. arranged in a smartphone and the like. The recording of the environment can then in particular be presented on a screen (i.e. the display device). If the screen is touch-sensitive, a user can thus move the virtual object, e.g. with his fingers, in the presentation of the environment and generally position it as desired.

Due to the combination of the presentation of the environment, i.e. the reality, and a virtual object, which actually appears to the user to be located in the real environment, a so-called "augmented reality" is provided. The augmented reality accordingly becomes visible by means of the display device.

Even though the user typically has only two dimensions available on the display device, provision can be made to position or to place the virtual object in three dimensions in the environment. For this purpose, provision can, for example, be made that a displacement in the depth is possible by enlarging or reducing the virtual object. Therefore, both the real world coordinates and the virtual world coordinates can in particular each have three components and accordingly represent a three-dimensional space.

The virtual object can preferably be selected by the user, whereby a source of randomness or entropy is already provided. The object can be of any desired nature, for example, an animal, an object, letters, numbers, symbols, etc.

On the determination of real world coordinates for real world points in the environment, distinctive points, for example corners, edges, points with special colors and/or the like, for which the real world coordinates are determined can in particular be used. Depending on the environment, the real world coordinates of the real world points will vary greatly so that a source of entropy for the generation of the random number is again present here. The real world coordinates can in particular also be made available by an API ("Application Programming Interface"), as will be explained in the following.

The determination of the virtual world coordinates can also be used as a source of randomness since the virtual world coordinates change depending on the positioning of the virtual object. In addition, at the virtual object, one or more virtual world points can be randomly determined or defined for which the virtual world coordinates are then determined, whereby a randomness is also again brought into play here.

It can be seen that by combining different sources of randomness, the random number generated in accordance with the invention is subject to a pronounced randomness overall and is therefore well suited for cryptographic applications.

It must be clarified that the "use" of the real world coordinates and virtual world coordinates during the generation of the random number can mean that the coordinates can be arbitrarily linked to one another, mathematically offset with one another, logically linked, strung together and/or the like. The generation of the random number is in particular performed by an electronic processing device that can, for example, be present in a smartphone or a tablet.

Further embodiments of the invention can be seen from the description, from the dependent claims, and from the drawings.

In accordance with a first embodiment, the generation of the random number comprises determining a vector between at least one point of the environment and one point of the virtual object and using said vector for the random number. The real world coordinates and the virtual world coordinates of the respective point (i.e., for example, of a real world point in the environment and of another/non-corresponding virtual world point in the virtual world) are used to calculate the vector. The values of the real world coordinates are in particular in each case subtracted from the values of the virtual world coordinates to obtain a corresponding vector. The values (e.g. of the components) in the vector can in turn be used in any desired manner during the generation of the random number; in this way, they can be linked, offset, strung together, etc. with one another and/or also with the real world coordinates and/or virtual world coordinates. The real world coordinates and virtual world coordinates used for the vector can in particular be selected randomly or by a user, whereby a source of entropy is again added during the generation of the random number.

In accordance with a further embodiment, the generation of the random number comprises lining up at least the real world coordinates of a real world point of the environment and the virtual world coordinates of a virtual world point of the virtual object after one another. At least a part of the random number (or even the whole random number) can then consist of values of the coordinates lined up after one another. If the values of the coordinates, for example, comprise a comma, it can be easily removed. Alternatively, the numerical values after the decimal point can also be truncated.

In accordance with a further embodiment, real world coordinates are transformed into virtual world coordinates and/or virtual world coordinates are transformed into real world coordinates, with the transformed coordinates being used during the generation of the random number. Since the position of the real world coordinate system relative to the position of the virtual world coordinate system is random, this randomness is introduced as a further source of entropy into the generation of the random number by the transformation of the coordinates. The use of the transformed coordinates during the generation of the random number here likewise again means that the transformed coordinates are arbitrarily linked, mathematically offset, and/or strung together, etc. with the other values available for the generation of the random number.

In accordance with a further embodiment, a time duration is taken into account in the generation of the random number, wherein a change of the real world coordinates and/or a change of the virtual world coordinates over the time duration is/are included in the random number. The changed coordinates can each be considered as separate values that can in turn be linked, offset, and/or strung together, etc. with previous values and other values available for the random number. Due to the taking account of the time duration, the fact can be utilized that the path on which the user moves the virtual object up to its end position is included in the generation of the random number as an additional source of entropy.

Due to the time duration, it is likewise possible to use changes in the environment, which are e.g. caused by a panning of the camera, as a further source of randomness. Unintentional camera movements by the user are in particular difficult to predict and are accordingly highly random.

Provision can in particular be made that a new set of real world coordinates and/or virtual world coordinates is generated for the time duration at predetermined time intervals (e.g. every 0.5 seconds or every second) if the real world coordinates and/or the virtual world coordinates of a respective point have changed.

In accordance with a further embodiment, the generated random number and/or a further random number that was generated in another manner is/are used as input values for a cryptographic hash function, wherein the hash function provides a hash value as a result. The further random number can e.g. originate from the electronic processing device that generated the random number. The further random number can, for example, be based on a measurement of the processor temperature (thermal noise source), based on activities in a memory, or based on a stochastically distributed duration of an electrical reloading process and the like. Due to the combination of the two different random numbers by means of the cryptographic hash function, the randomness is further increased. Even with knowledge of a random number, it would be virtually impossible for an attacker to predict or to determine the hash value.

In accordance with a further embodiment, the generated random number and/or the hash value is/are used as an input value for a random number generator. The input value can also be designated as a "seed. The random number generator can be a so-called CSPRNG ("Cryptographically Secure Pseudo Random Number Generator"). With the random number generator, many further additional random numbers can be generated very quickly based on the seed/input value. The additional random numbers are likewise highly random since at least one of the input values, namely the random number generated by the method described herein, is likewise highly random. The additional random number is in particular a value derived from the random number. By performing the method described herein once, a very large number of strong additional random numbers can be generated in this manner (at a high speed). The additional random numbers can then in particular be used in different cryptographic applications, whereby e.g. the communication between different participants can be secured.

In accordance with a further embodiment, the virtual object is displaced and/or rotated about one or more axes and/or changed in its size during the positioning.

Due to the displacement (e.g. in three dimensions), rotation, and the change of the size, additional degrees of freedom are introduced for the user, which in turn increases the entropy. It is understood that said operations are performed virtually, i.e. a displacement is in particular presented to the user on the display device, i.e. in augmented reality.

Due to the aforementioned operations during the positioning of the virtual object, a huge amount of possibilities of positioning the virtual object result for the user. The number of possible positions of the virtual object is greatly increased solely by the rotation about, for example, three axes. If 0.1 degree increments is assumed during the rotation, 3,600 different positions per axis result. Due to the combination of the rotation in three axes, $3,600^3$ possibilities, i.e. approximately 46.7 billion possibilities, thus already result. The possibilities are further increased by the combination with a corresponding displacement and/or scaling of the virtual object.

In accordance with a further embodiment, the detection unit and the display device are part of an electronic device, preferably of the same electronic device, wherein the electronic device in particular performs the generation of the random number. The generation or the calculation of the random number can in this respect be performed by an electronic processing device of the electronic device. Due to the generation of the random number in a single device, in particular no external transmission e.g. of the real world coordinates and/or virtual world coordinates is required, which may potentially be insecure. The electronic device can, for example, be a smartphone, a tablet, augmented reality (AR) glasses, a notebook, or a field device equipped with a camera. Instead of the camera, another technology, e.g. LIDAR (Light Detection And Ranging) or LADAR (Laser Detection And Ranging) can also be used as the detection unit. The display unit can generally be designed as a human machine interface and is preferably a touch screen. In the case of a notebook or AR glasses, the positioning can also take place via a mouse and/or a keyboard or other input possibilities instead of by the touchscreen.

The real world coordinates can preferably be made available by an API. The API is based on the recording of the environment and generates a point cloud of real world points based on the recording, e.g. for objects in the recording that were recognized by the software underlying the API. The underlying software can e.g. be ARCore from Google or ARKit from Apple. In this respect, there is a certain randomness as to which real world points are output by the API at all and which real world coordinates the real world points receive from the API. How exactly the real world coordinates are determined by the underlying software is typically secret such that a further source of randomness is hereby provided, on the one hand, and an attack is additionally made more difficult, on the other hand.

In accordance with a further embodiment, the random number and/or the additional random number is/are used to establish an encrypted data connection between the electronic device and a field device and preferably to control and/or to configure the field device via the encrypted data connection. The control of an industrial process can thus take place from the electronic device via the encrypted data connection. The control is in this respect secured by the random number and/or the additional random number. An encryption key for the data connection can in particular be generated by the random number and/or the additional random number. For example, a behavior of a servo drive or of a sensor can be changed via the data connection.

One or more of the embodiments/possibilities set forth herein can also be combined with one another and/or used side-by-side during the generation of the random number. For example, the first digits of the random number can thus be generated by a simple stringing together of the values of the real world coordinates and virtual world coordinates. Further digits of the random number can be provided from the values of the aforementioned vector and/or by the transformation of the coordinates. Further digits can in turn be generated on the basis of the time duration. It is likewise possible that the generation of the random number is based on only one of the possibilities described herein.

A further subject of the invention is an electronic device comprising a detection unit, a display device, and an electronic processing device, wherein the device is configured
to generate a recording of an environment by means of the detection unit,
to present the recording by means of the display device,
to enable the positioning of a virtual object in the presentation of the recording in the environment,
to determine real world coordinates for real world points in a real world coordinate system for the environment,
to determine virtual world coordinates for one or more virtual world points in a virtual world coordinate system for the virtual object,
to use at least the real world coordinates of a real world point of the environment and the virtual world coordinates of a virtual world point of the virtual object to generate a random number, and
preferably to use the random number and/or a value derived from the random number in a cryptographic application.

The statements regarding the method in accordance with the invention accordingly apply to the electronic device; this in particular applies with respect to advantages and embodiments.

Figure 2:
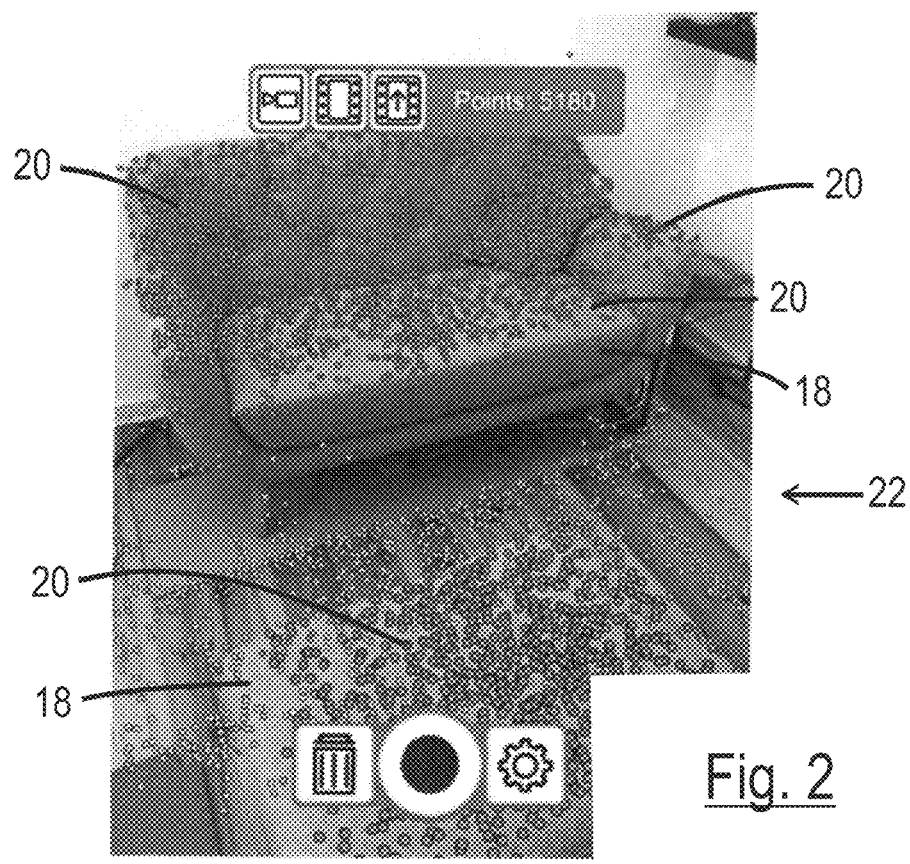
Figure 3:
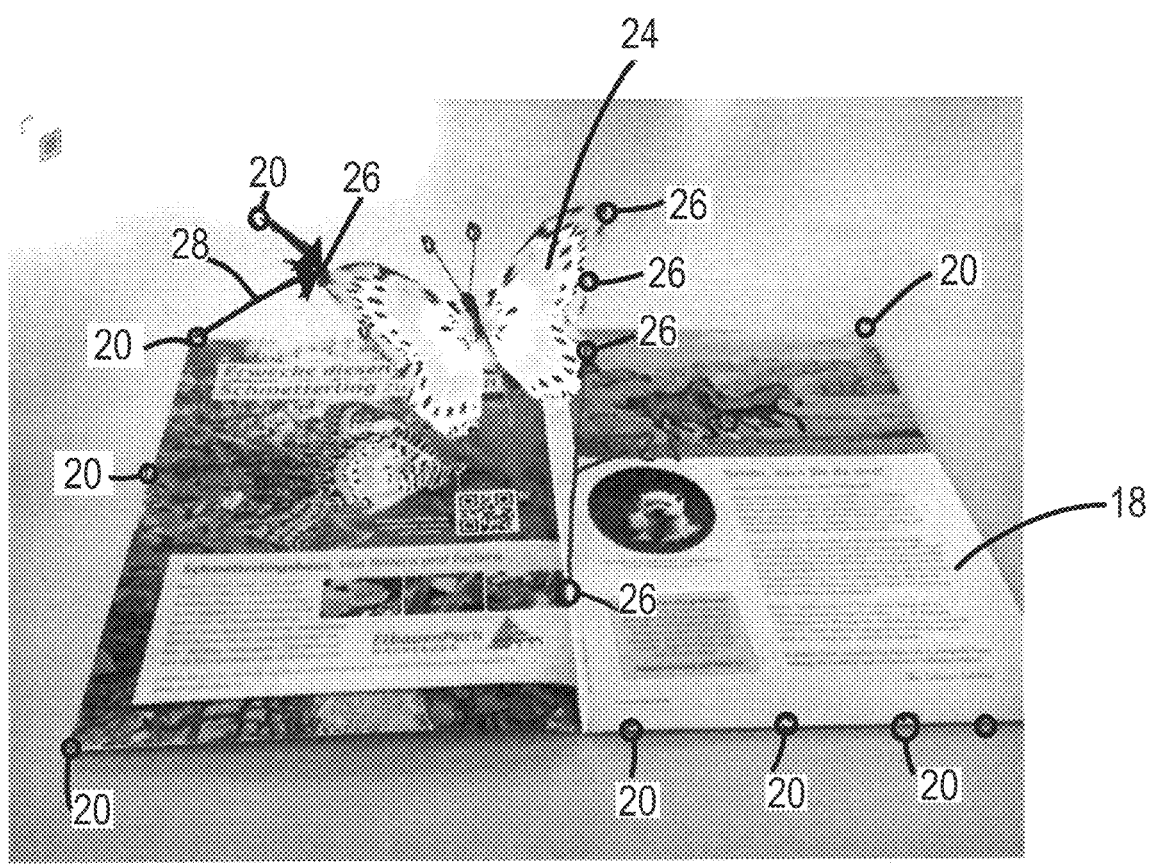

The invention will be presented purely by way of example with reference to the drawings in the following. There are shown:

FIG. 1 schematically the detection of the real environment;

FIG. 2 a point cloud with real world coordinates;

FIG. 3 the positioning of a virtual object; and

Figure 4:
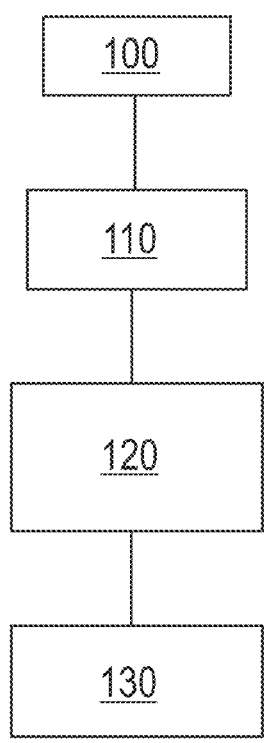

FIG. 4 the procedure for generating a random number.

FIG. 1 shows an electronic device in the form of a smartphone 10 that has a camera 12 as a detection unit. The smartphone 10 also has a touch screen 14 as a display device.

As can be recognized in FIG. 1, a recording of an environment 16 is prepared by the smartphone 10, wherein different objects 18, e.g. furniture, are present in the environment 16.

An exemplary recording of the environment 16 is shown in FIG. 2, wherein the objects 18, i.e. the furniture, are also shown in FIG. 2.

Software executed on the smartphone 10 provides real world points 20 (i.e. points in a real world coordinate system) via an API. The real world points 20 each comprise real world coordinates for three dimensions. In FIG. 2, it can be recognized that a plurality of real world points 20 are output via the API that together form a point cloud 22.

The positioning of a virtual object 24 is now shown in FIG. 3, wherein the virtual object 24 in FIG. 3 is a butterfly. The virtual object 24 is positioned in the proximity of an object 18, in this case a magazine.

A user of the smartphone 10 can position the virtual object 24 in any desired position via the touchscreen 14. It is also possible to rotate and scale the virtual object 24 in three axes. For the virtual object 24, virtual world coordinates are determined in three dimensions for a plurality of virtual world points 26 (i.e. points in a virtual world coordinate system). The virtual world coordinates change in accordance with the position selected by the user for the virtual object 24.

The real world points 20 and the virtual world points 26 are typically not displayed on the touchscreen 14 for the user.

Vectors 28 can also be determined between the real world points 20 and the virtual world points 26, as already stated.

To generate a random number, a recording of the environment 16 can first be generated in step 100, as schematically shown in FIG. 4. In step 110, the virtual object 24 is subsequently positioned in the environment 16. In step 120, both real world coordinates for real world points 20 and virtual world coordinates for virtual world points 26 are determined. The real world coordinates and the virtual world coordinates are then used in step 120 to generate a random number. In the present example, the real world coordinates for all the real world points 20 and the virtual world coordinates for all the virtual world points 26 can be joined to one another (i.e. written behind one another) to obtain the random number in this manner. Furthermore, it is also possible to generate additional random numbers by means of the random number generator already described.

In step 130, the random number and/or the additional random number is/are then used for a cryptographic application, for example, for establishing an encrypted connection between the smartphone 10 and a field device (not shown) of an industrial plant.

Due to the many sources of randomness in the process of the generation of the random number, the generated random number is highly random and thereby enables a secure communication, e.g. between the smartphone 10 and the field device.

REFERENCE NUMERAL LIST

10 smartphone
12 camera
14 touchscreen
16 environment
18 object
20 real world point
22 point cloud
24 virtual object
26 virtual world point
28 vector
100 recording the environment
110 positioning the virtual object
120 generating the random number
130 cryptographic application

The invention claimed is:

1. A method of generating random numbers for cryptographic applications, comprising:
   generating a recording of an environment by means of a detector,
   presenting the recording by means of a display,
   positioning a virtual object in the presentation of the recording in the environment,
   determining real world coordinates for real world points in a real world coordinate system for the environment,
   determining virtual world coordinates for one or more virtual world points in a virtual world coordinate system for the virtual object,
   generating a random number using at least the real world coordinates of a real world point of the environment and the virtual world coordinates of a virtual world point of the virtual object, and
   using the random number and/or a value derived from the random number in a cryptographic application.

2. The method in accordance with claim 1, wherein the generating of the random number comprises determining a vector between at least one point of the environment and one point of the virtual object and using said vector for the random number.

3. The method in accordance with claim 1, wherein the generating of the random number comprises lining up at least the real world coordinates of a real world point of the environment and the virtual world coordinates of a virtual world point of the virtual object after one another.

4. The method in accordance with claim 1, wherein the real world coordinates are transformed into the virtual world coordinates and/or the virtual world coordinates are transformed into the real world coordinates, with the transformed coordinates being used in the generating of the random number.

5. The method in accordance with claim 1, wherein the generating further comprises taking into account a time duration, wherein a change of the real world coordinates and/or a change of the virtual world coordinates over the time duration is/are included in the random number.

6. The method in accordance with claim 1, further comprising using the generated random number and a further random number that generated in another manner as input values for a cryptographic hash function, wherein the hash function provides a hash value as a result.

7. The method in accordance with claim 1, further comprising using the generated random number and/or the hash value as an input value for a random number generator.

8. The method in accordance with claim 1, wherein the virtual object is displaced and/or rotated about one or more axes and/or changed in its size during the positioning step.

9. The method in accordance with claim 1, wherein a plurality of real world coordinates of real world points of the environment and/or of virtual world coordinates of virtual world points of the virtual object are used to generate the random number.

10. A method in accordance with claim 1, wherein the detector and the display are part of an electronic device.

11. A method in accordance with claim 10, further comprising using the random number to establish an encrypted data connection between the electronic device and a field device.

12. An electronic device comprising a detector, a display, and an electronic processing device, wherein the electronic device is configured to generate a recording of an environment by means of the detector,
   present the recording by means of the display,
   enable positioning of a virtual object in the presentation of the recording in the environment,
   determine real world coordinates for real world points in a real world coordinate system for the environment,
   determine virtual world coordinates for one or more virtual world points in a virtual world coordinate system for the virtual object,
   use at least the real world coordinates of a real world point of the environment and the virtual world coordinates of a virtual world point of the virtual object to generate a random number, and
   use the random number and/or a value derived from the random number in a cryptographic application.

13. The method of claim 7, wherein the random number generator generates additional random numbers.

14. The method of claim 9, wherein the plurality of real world coordinates comprises at least 5, at least 10, or at least 100.

15. The method of claim 10, wherein the electronic device performs the generation of the random number.

16. The method of claim 11, wherein the step of using the random number comprises using the random number to at least one of control and configure the field device via the encrypted data connection.

17. The method in accordance with claim 10, further comprising using at least one of the random number and an additional random number to establish an encrypted data connection between the electronic device and a field device.

18. The method in accordance with claim 17, further comprising using the at least one of the random number and the additional random number to at least one of control and configure the field device via the encrypted data.

* * * * *